(12) United States Patent
Anderberg

(10) Patent No.: US 7,596,825 B2
(45) Date of Patent: Oct. 6, 2009

(54) METHOD AND APPARATUS FOR CONNECTING A PASSENGER BRIDGE TO AN AIRCRAFT

(75) Inventor: Nils-Erik Anderberg, Trelleborg (SE)

(73) Assignee: FMT International Trade AB, Trelleborg (SE)

( * ) Notice: Subject to any disclaimer, the term of this patent is extended or adjusted under 35 U.S.C. 154(b) by 0 days.

(21) Appl. No.: 10/573,096

(22) PCT Filed: Sep. 21, 2004

(86) PCT No.: PCT/SE2004/001351

§ 371 (c)(1),
(2), (4) Date: Dec. 18, 2006

(87) PCT Pub. No.: WO2005/028307

PCT Pub. Date: Mar. 31, 2005

(65) Prior Publication Data

US 2007/0084001 A1    Apr. 19, 2007

(30) Foreign Application Priority Data

Sep. 24, 2003    (SE) .................................... 0302528

(51) Int. Cl.
*E01D 1/00* (2006.01)
(52) U.S. Cl. ........................................................ 14/71.5
(58) Field of Classification Search ............ 14/71.3, 14/71.5
See application file for complete search history.

(56) References Cited

U.S. PATENT DOCUMENTS

| 5,084,936 | A  | * | 2/1992  | Thomas, Jr. ............ 14/71.5 |
| 6,526,615 | B1 |   | 3/2003  | Hutton et al. ........... 14/71.5 |
| 6,552,327 | B2 |   | 4/2003  | Anderberg .............. 250/221 |
| 6,637,063 | B1 |   | 10/2003 | Hutton et al. ........... 14/71.5 |
| 6,742,210 | B2 |   | 6/2004  | Hutton et al. ........... 14/71.5 |

(Continued)

FOREIGN PATENT DOCUMENTS

DE    101 63 077    7/2003

(Continued)

OTHER PUBLICATIONS

Airbus Industrie, France. "Brochure entitled A3XX Ground Operations," p. 59, copyright Mar. 2000.

(Continued)

*Primary Examiner*—Gary S Hartmann
(74) *Attorney, Agent, or Firm*—Alfred J. Mangels

(57) ABSTRACT

A method and apparatus for connecting the outer end of a telescopically extendable passenger bridge to an aircraft door aft of the wing. An inner part of the bridge is connected to a terminal building by a rotunda, and the outer part of the bridge carries a cabin for connection to the aircraft at a passenger door. The bridge is movable by a drive system positioned at the outermost end of the inner part of the bridge, and the outer part is pivotable in a vertical plane relative to the inner part. The bridge is moved to a docking position, and the drive system is positioned close to the leading edge of the aircraft wing. After telescopically extending the inner part of the bridge, the outer part is swung downward and is telescopically extended to an end position at which the cabin is docked against the aircraft body.

3 Claims, 11 Drawing Sheets

U.S. PATENT DOCUMENTS

| | | | |
|---|---|---|---|
| 6,757,927 B2 | 7/2004 | Hutton et al. | 14/71.5 |
| 6,789,286 B1 | 9/2004 | Hutton et al. | 14/71.5 |
| 6,820,296 B2 | 11/2004 | Hutton et al. | 14/71.5 |
| 6,862,768 B2 * | 3/2005 | Hutton | 14/71.5 |
| 6,907,635 B2 | 6/2005 | Hutton et al. | 14/71.5 |
| 6,931,687 B2 | 8/2005 | Hutton et al. | 14/71.5 |
| 6,954,959 B2 * | 10/2005 | Hutton | 14/71.5 |
| 2003/0145402 A1 | 8/2003 | Hutton et al. | 14/71.5 |
| 2004/0148716 A1 | 8/2004 | Hutton | 14/71.5 |

FOREIGN PATENT DOCUMENTS

| | | |
|---|---|---|
| SE | 513 504 | 8/1999 |
| WO | WO 99/42365 A1 | 8/1999 |
| WO | WO 00/55040 A1 | 9/2000 |

OTHER PUBLICATIONS

Airbus Industrie, France. Portion of brochure entitled "Upper Deck Servicing," 10 pages total, including numbered pp. 74-81, copyright Apr. 2000.

McGraw-Hill Business Week Daily. 1 page entitled "Southwest Tests First Narrowbody Dual Boarding Bridge," copyright 2000.

http://www.planebusiness.com/tscolumns/ts052800.html. Plane Business, Internet web pages entitled "WingTips, From Dallas With Luv," by Holly Hegeman, 3 pages, republication of a column that originally appeared in TheStreeet.com on May 29, 2000.

http://daily.stanford.edu/daily/servlet/templ?page=printable &repository=0001_article&id Internet web page. Stanford Daily, article entitled "What's Up, Doc?" by Udara Fernando, 1 page, dated May 30, 2001.

http://www.tribuneindia.com/2001/200110927/science.htm, Internet Web Site. The Tribune, Online Edition, Science Tribune, New Products & Discoveries, Article entitled "All Aboard' times two," referencing as the source Popular Science, 7 pages, dated Sep. 27, 2001.

FMT Aircraft Gate Support Systems AB, Sweden. Brochure entitled Dual Boarding Bridge System for Boeing 737 and Airbus 319-321, 4 pages, undated.

* cited by examiner

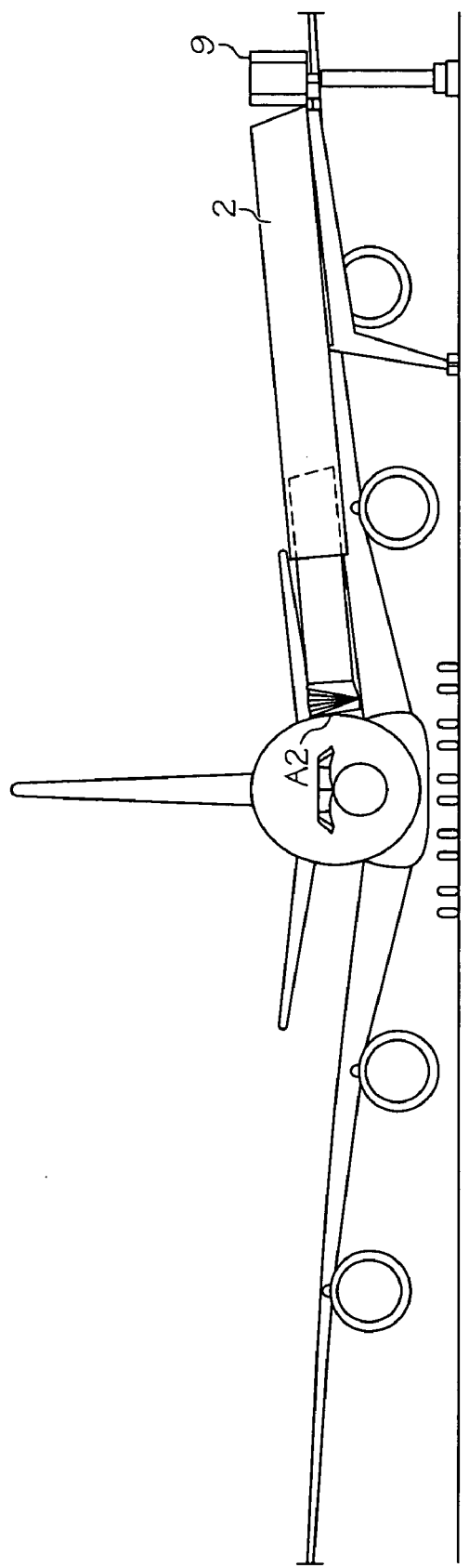

METHOD AND APPARATUS FOR CONNECTING A PASSENGER BRIDGE TO AN AIRCRAFT

BACKGROUND OF THE INVENTION

1. Field of the Invention

The present invention relates to a method of connecting a passenger bridge to an aircraft, and to an arrangement for that end.

2. Description of the Related Art

Many airports now include passenger bridges which are connected to an aircraft from a terminal building and via which passengers embark and disembark. Several different types of passenger bridges are known to the art, of which one is a so-called Mobile Telescopic Bridge (MTB) that includes a number of telescoping parts, where the outermost part is supported by a bogie that has separately driven wheels. The bogie functions to maneuver the passenger bridge on the airport gate area apron toward and away from an aircraft. Located at the connection of the passenger bridge to a terminal building is a rotunda, which is rotatable about a vertical axis and which is supported by a ground-anchored pillar. Located at the outermost part of the passenger bridge is a cabin that can be rotated relative to the outermost telescopic element of the bridge. The cabin is that part of the arrangement intended for connection to the door of an aircraft.

A serious problem resides in the relatively long time taken for passengers to board the aircraft and also to disembark when the aircraft is parked at a so-called gate. That means that the time lapse from the time at which the aircraft has landed to the time at which it can re-start is unnecessarily long, which is both uneconomic and causes the passengers to feel that they are forced to wait unnecessarily.

It is undesirable for passengers to wait on the aircraft parking area for safety reasons.

Aircraft tend to be both larger and longer. A serious technical problem arises with regard to connecting a telescopic passenger bridge to a rear door that is located aft of a wing of an aircraft, due to the significant distance from the rotunda to a rear door. That distance can exceed 30-40 meters. There is found in that respect a solution in which the passenger bridge is suspended from a device that resembles a crane, so that the bridge is able to extend stably over the wing to an extent that enables the bridge to be connected to a rear door of the aircraft. That solution is both clumsy and expensive.

Another solution is described in Swedish patent specification 513 504. In accordance with that patent specification, the passenger bridge is given mobility through the medium of a drive means arranged in the outer part of the bridge and having wheels that rest against the airport parking apron surface, wherein the passenger bridge includes telescoping parts. In accordance with that patent specification, the passenger bridge is driven by the drive means after an aircraft has been parked, so as to cause the drive means and the outer part of the passenger bridge to pass outwardly of the aircraft wing and then in behind the wing for connection to the rear door of the aircraft.

Although that Swedish patent provides a conceivable solution to the above-described problem, it itself causes a problem with regard to present-day large aircraft, such as the Airbus 380, which have two flight decks. In addition to requiring a passenger bridge in excess of 50 meters in length in order to move around the wing, the time taken to connect the bridge to a rear door would be unacceptably long. Moreover, the location of the bridge connection to the rotunda at the airport building would be much too high for the bridge to be connected to a rear door on the lower flight deck and to pass freely over the wing of the aircraft. The outermost tip of the wing of an Airbus 380 is situated at a greater height above the ground than are the doors on the upper deck.

The present invention solves that problem and provides a simple and convenient solution to the problem of connecting a passenger bridge to a rear door on the upper deck of a two-deck aircraft, and also a rear door on the lower deck of such an aircraft.

SUMMARY OF THE INVENTION

Accordingly, the present invention relates to a method of connecting the outer end of a passenger bridge to a door on the body of an aircraft, whereby the door is located on one side of the aircraft and aft of an aircraft wing. The inner part of the passenger bridge is connected to a terminal building via a rotunda, and the outer part of the passenger bridge carries a cabin intended for connection to the aircraft at a door thereof. The passenger bridge is movable through the agency of a drive means that rests against a parking apron at the airport, through the medium of wheels included in the drive means. The passenger bridge includes telescoping parts. The drive means is located at the outer end of the inner part of the passenger bridge, thereby enabling the outer part of the passenger bridge to swing in a vertical plane relative to the inner part of the bridge. The passenger bridge is driven from a parking position to a docking position by means of the drive means after an aircraft has parked for connection to the passenger bridge. The drive means is positioned close to the leading edge of the aircraft wing while telescoping the inner part of the passenger bridge. The outer part of the passenger bridge is then swung down and the outer part telescopes outwardly to an end position at which the cabin can be docked with the aircraft body.

The present invention also relates to apparatus for carrying out the method.

BRIEF DESCRIPTION OF THE DRAWINGS

The present invention will now be described in more detail partly with reference an embodiment of the invention illustrated in the accompanying drawings, in which

FIG. 15 is a side view of a passenger bridge connected to a forwardly located door on the lower deck.

DESCRIPTION OF THE PREFERRED EMBODIMENTS

Figure 1:
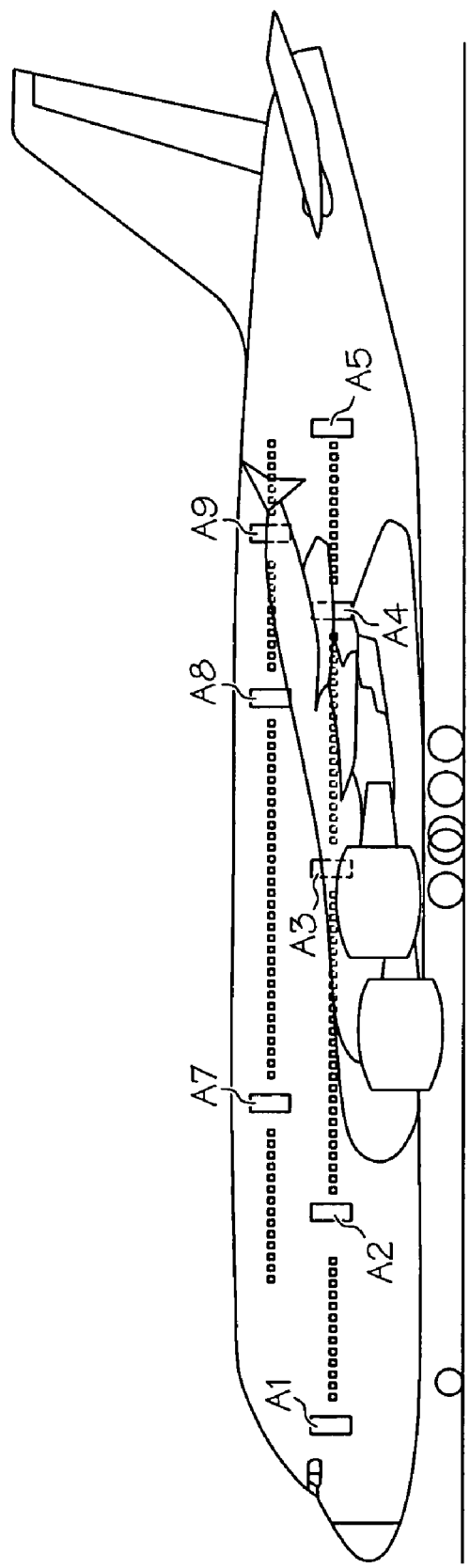
FIG. 1 is a side view of an Airbus A380 showing the several passenger door locations.

FIG. 1 is a side view of an aircraft designated Airbus A 380, where the locations of the several passenger doors A1-A5, A7-A9 have been indicated.

Figure 2:
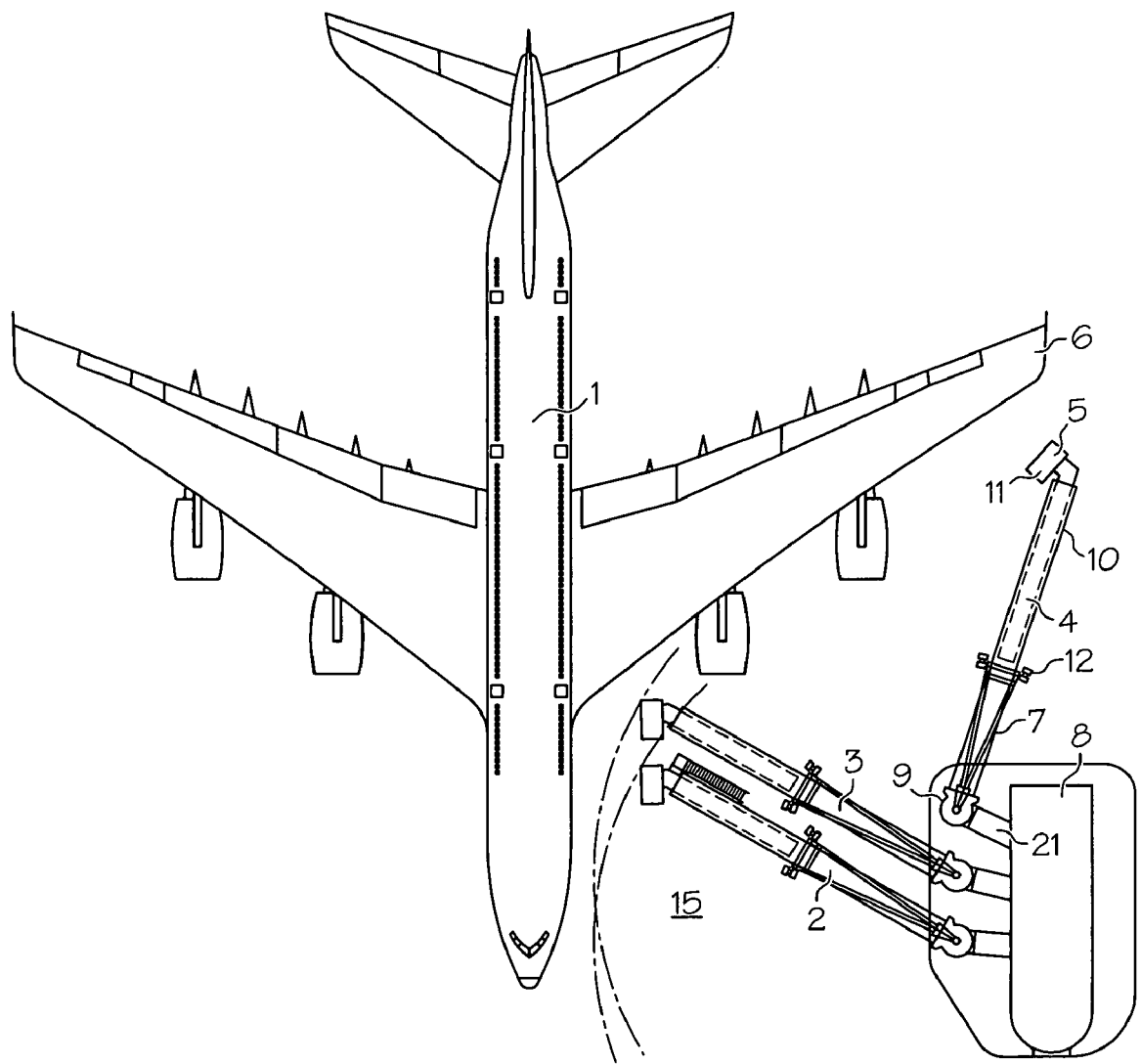
FIG. 2 shows the aircraft and passenger bridges from above.

FIG. 2 shows the aircraft 1 and passenger bridges 2, 3, 4 from above.

The present invention relates to a method of connecting the outer end 5 of a passenger bridge 4 to a passenger door A4, A5, A8, A9 on an aircraft body. The doors are located on one side of the aircraft and aft of the aircraft wing 6. The inner part 7 of the bridge is connected to a terminal building 8 via a rotunda 9. The outer part 10 of the bridge carries a cabin 11 which is intended for connection to a passenger door on the aircraft.

Figure 5:
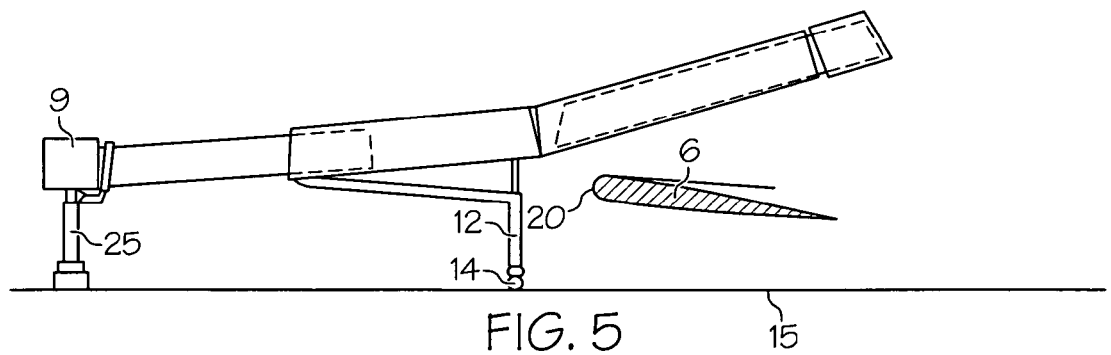
Figure 6:
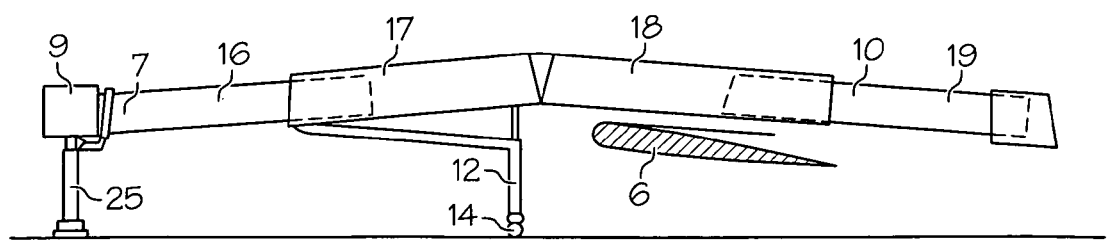
Figure 7:
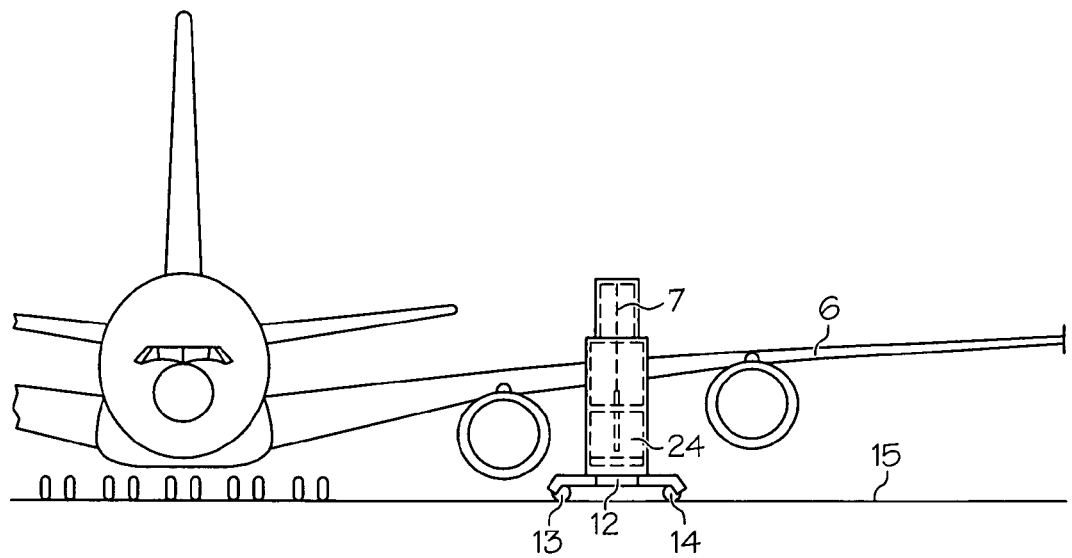
FIG. 7 is a sectional view of the passenger bridge taken at the drive means and shows the placement of the bridge in relation to the aircraft.

The passenger bridge 4 is movable through the agency of a drive means 12, which rests against the airport parking apron 15 on wheels 13, 14 (see FIGS. 5 and 7). Bridge 4 includes telescoping parts 16, 17, 18, 19 as shown in FIG. 6.

In accordance with the invention, the drive means 12 is located at the outer end of the inner part 7 of the bridge 4. The outer part 10 of the passenger bridge can be swung in a vertical plane relative to the inner part 7 of the bridge.

Figure 3:
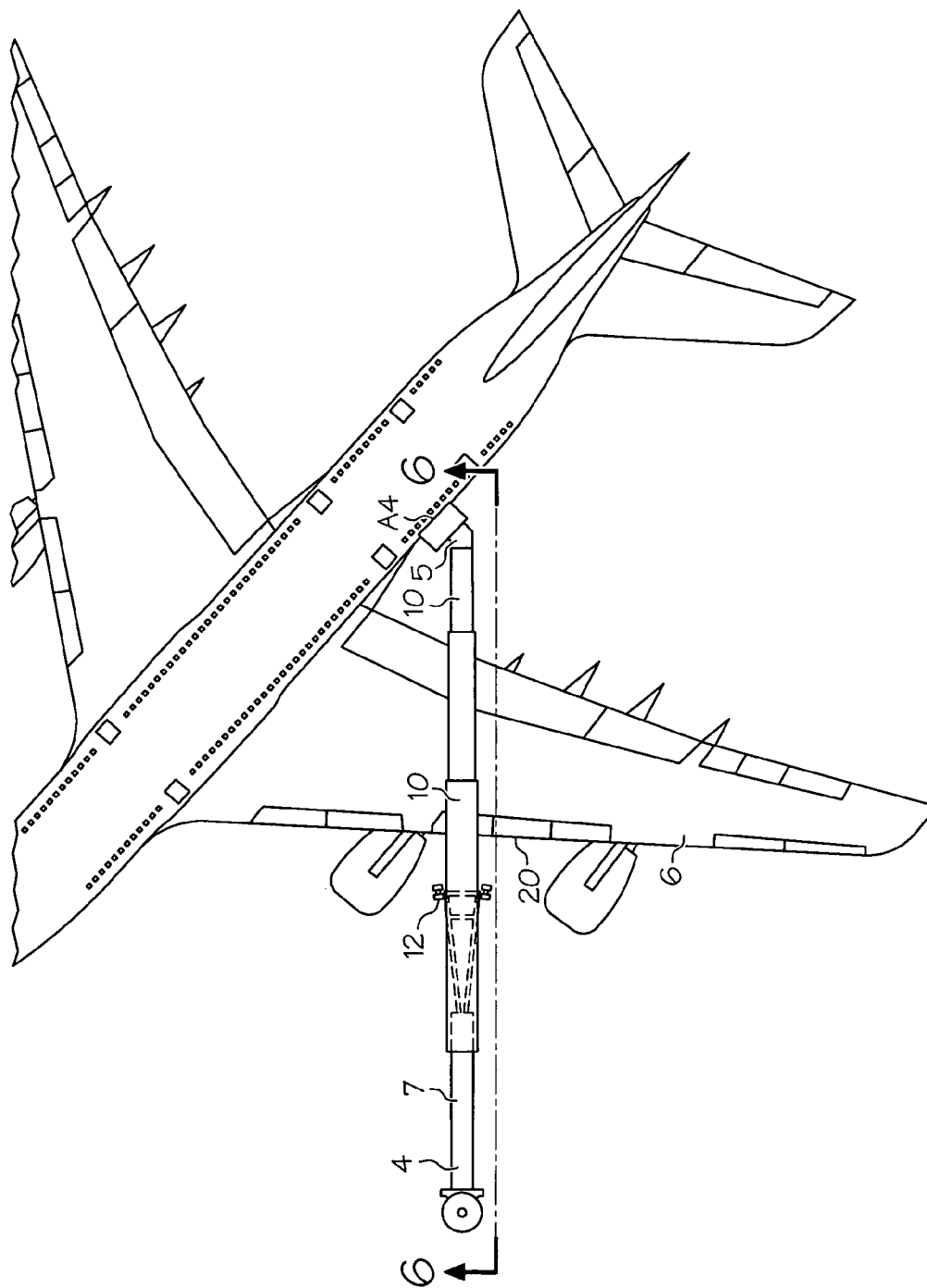
FIG. 3 shows a passenger bridge connected to a rear door A4 on the lower deck of the aircraft.

When an aircraft has parked for connection to the passenger bridge 4, the bridge 4 is moved by the drive means 12 from a parking position, shown in FIG. 2, to a docking position, shown in FIG. 3, in which the drive means 12 is positioned close to the leading edge 20 of the aircraft wing 6 by telescopically extending the inner part 7 of the bridge. The outer part 10 of the bridge is then swung downwards relative to the inner part 7 of the bridge and telescopically extends to an end position in which the cabin 5 can be docked to the aircraft body, see FIG. 3.

The outer end of the outer part 10 of the passenger bridge 4 is thus adapted for connection to a door on the body of the aircraft, the door being located on one side of the aircraft and aft of the aircraft wing 6. That outer end includes the cabin 5, which can be swung about a vertical axis to take a position parallel with the aircraft body. The cabin 5 is also telescopically movable for limited movement to a position in which it lies adjacent to and around the door on the body of the aircraft.

The inner end 7 of the passenger bridge is connected to a terminal building 8. That connection is designed for connection of the inner end of the bridge to the terminal building via at least one rotunda 9 and a further passageway 21 for pedestrian traffic.

As mentioned previously, the passenger bridge 4 is movable through the agency of a drive means 12 provided on the outer end of the inner part 7 of the bridge. The drive means 12 is of a known kind and rests against the airport parking apron 15 on wheels 13, 14, wherein the wheels are preferably driven individually. The drive means enables the passenger bridge to be driven in any desired direction. The passenger bridge also includes, as known per se, telescopic pads, i.e., telescoping elements in the form of tunnel-like elements that are generally rectangular in cross section.

The telescopic construction of the passenger bridge and the design of the drive means described above are well known to the art and will not therefore be described in more detail.

The telescoping elements 16, 17 of the inner part 7 of the passenger bridge (see FIGS. 4-6) are extended and withdrawn, respectively, as the passenger bridge is moved along the parking apron 15 by the drive means.

The telescoping elements 18, 19 of the outer part 10 of the passenger bridge are extended and withdrawn, respectively, with the aid of a suitably known drive means (not shown) that functions to extend and withdraw, respectively, the outer telescoping element 19 from and into the inner telescoping element 18.

Figure 16:
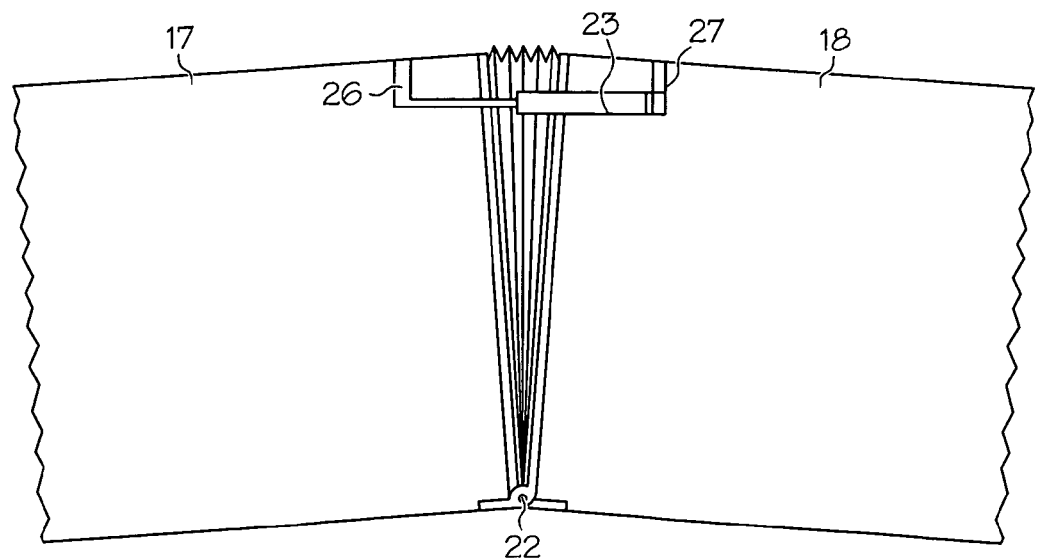
FIG. 16 is a fragmentary side view of a connection region in which a part of the passenger bridge can be pivoted in a vertical plane.

In accordance with one preferred embodiment of the invention, the outer part 10 of the passenger bridge is hinged to the inner part 7 of the bridge, i.e., the elements 17 and 18 of the bridge are hinged together so as to enable the outermost part 10 of the bridge to be displaced in a vertical plane, relative to the inner part 7 of the bridge, as shown in FIG. 16.

The vertical position of the bridge outer part 10 is varied with the aid of force generating means acting between the outermost element 17 of the inner part 7 and the innermost element 18 of the outer part 10. FIG. 16 illustrates diagrammatically a pivot joint 22, such as a hinge, and a force generating means in the form of one or more hydraulic piston-cylinder devices 23 acting between the attachment points 26, 27 in the respective bridge elements 17, 18, respectively.

Figure 4:
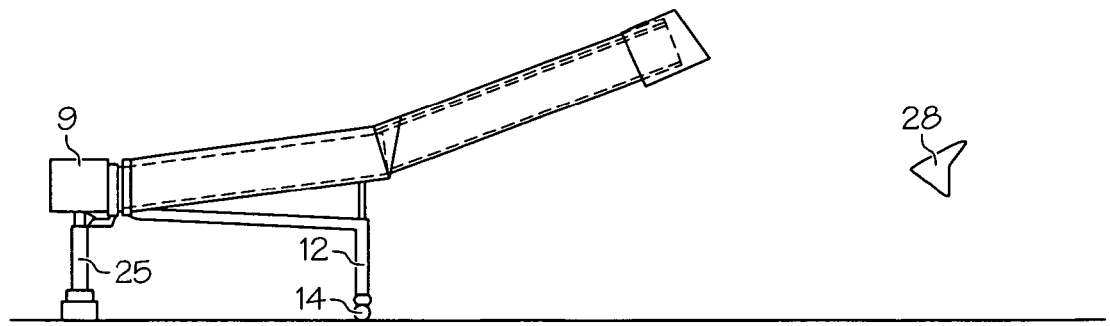
FIGS. 4-6 illustrate the sequence of procedural steps of connecting the passenger bridge of FIG. 3 to the aircraft.

In accordance with a further preferred embodiment of the invention, shown in FIGS. 4-6, the inner part 7 of the passenger bridge is hinged to the rotunda 9, so as to enable the inner part to be swung in a vertical plane. As shown in FIG. 7, the vertical position of the outermost end of inner part 7 of the bridge is varied with the aid of lifting means 24 adjacent the drive means 12. The lifting means 24 can have the form of a hydraulic piston-cylinder device.

Alternatively, the rotunda 9 can be raisable and lowerable so as to be able to take different vertical positions.

The rotunda is supported by a ground-mounted vertical pillar 25. When the rotunda can be raised and lowered, the rotunda 9 is supported by a ground-mounted vertical pillar that includes lifting means, such as a hydraulic piston-cylinder device, for changing the length of the pillar and therewith displacing the rotunda in a vertical direction.

However, it is preferred that the inner part 7 of the passenger bridge is hinged to the rotunda 9 so as to enable the inner part to be swung in a vertical plane, and that the vertical position of the inner bridge part can be varied with the aid of the lifting means 24 at the drive means 12.

In accordance with a highly significant embodiment of the invention, the inner part 7 of the bridge and its outer part 10 are movable into a vertical position in which the bridge 4 will pass freely over the upper surface of the wing 6. Vertical movements of inner part 7 can be made prior to moving the bridge 4 in over the wing 6 of the aircraft and also subsequent to having moved the bridge 4 in over the wing.

Those movements are shown in FIGS. 4-6, of which FIG. 4 illustrates a starting position where the aircraft is parked; see also FIG. 2. The reference numeral 28 marks the outmost tip of the wing 6. FIG. 5 illustrates the position where the drive means 12 has been driven to a position close to the leading edge 20 of the wing 6 during outward telescoping of the inner part 7 of the bridge. FIG. 6 shows the outer part 10 of the bridge being telescoped outwardly and then lowered into docking position with a rear door A4 on the lower deck, as shown in FIG. 3.

Figure 8:
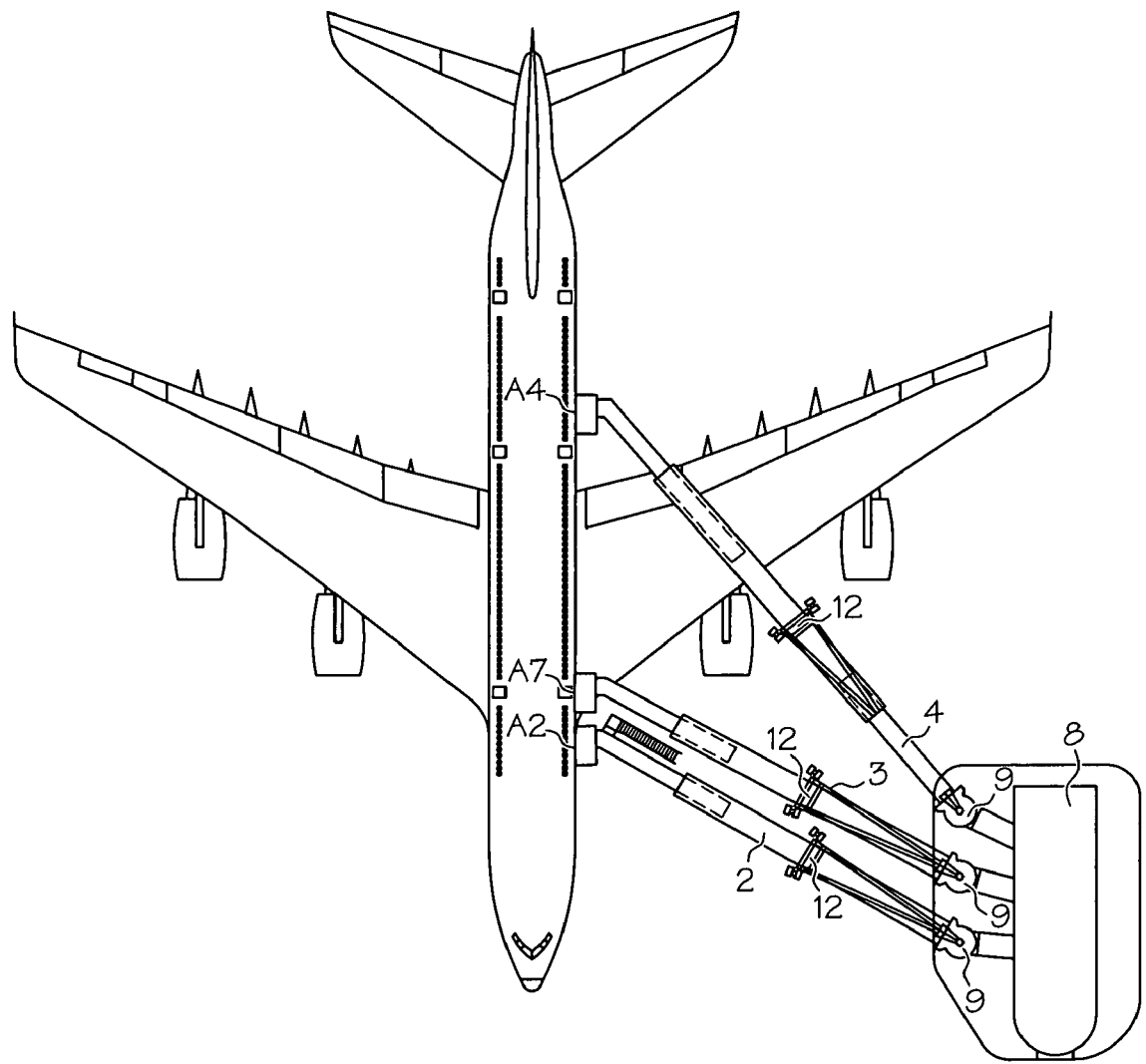
FIG. 8 shows three passenger bridges connected respectively to a rear door A4 on the lower deck and two front doors A2, A7 on the lower and the upper deck respectively.
Figure 9:
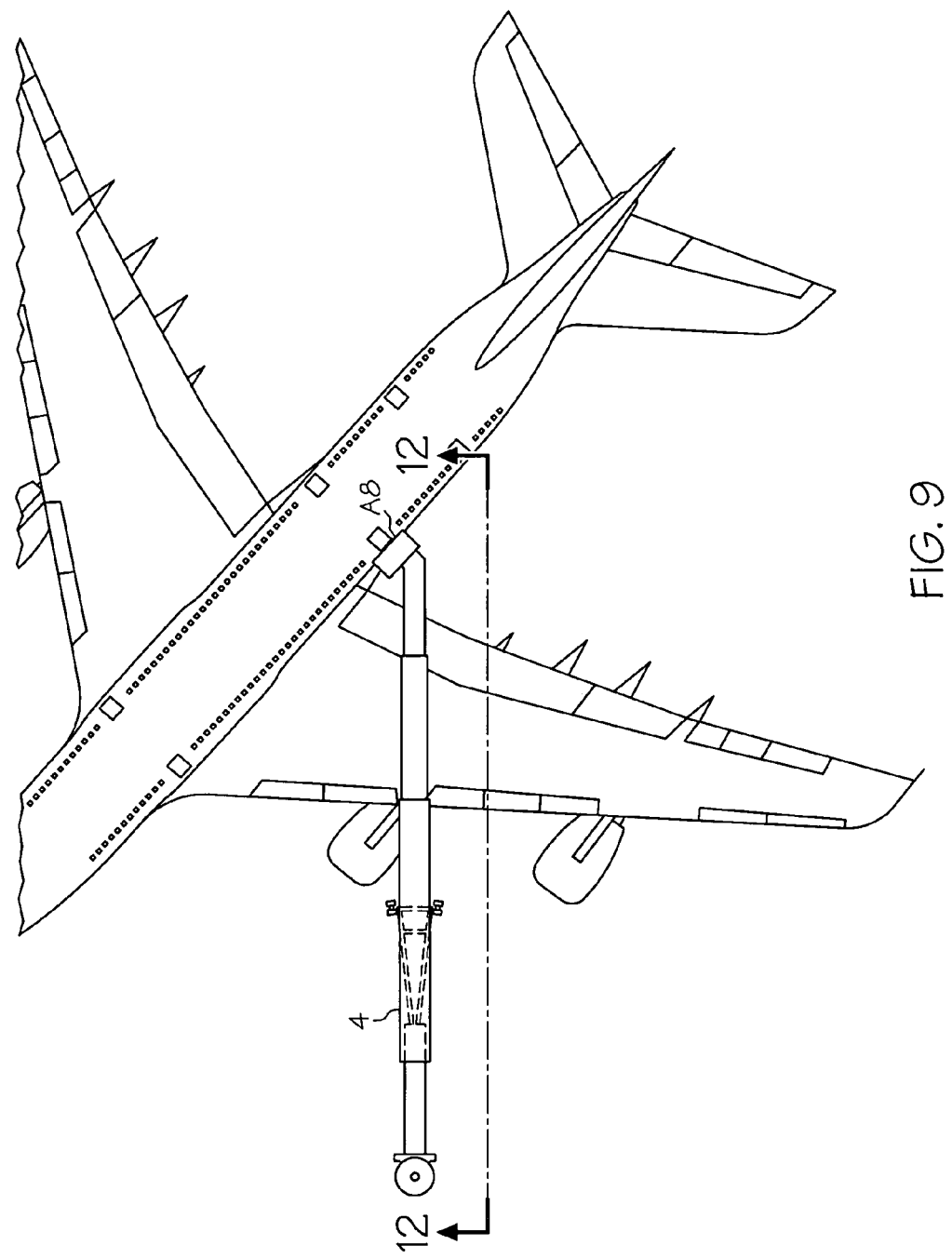
FIG. 9 shows a passenger bridge connected to a rear door A8 on the upper deck of the aircraft.

FIG. 8 illustrates from above the state in which the passenger bridges of FIG. 2 have been docked to both forwardly located doors A2 and A7, and a rearwardly located door A4 on the lower deck.

The passenger bridges 2 and 3 are conventional telescoping bridges. Those bridges can also be swung in a vertical plane with the aid of lifting means at respective drive means 12 to allow connection of the bridges with forwardly located doors at different heights above ground level.

Figure 10:
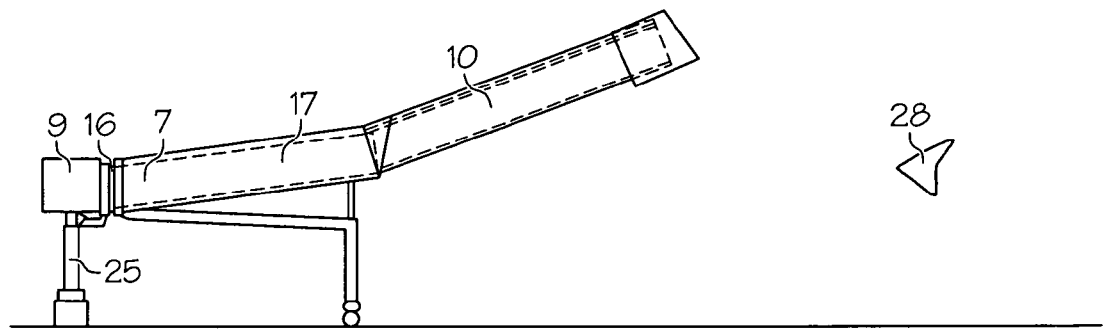
FIGS. 10-12 illustrate the sequence of procedural steps in connecting the passenger bridge of FIG. 9 to the aircraft.
Figure 11:
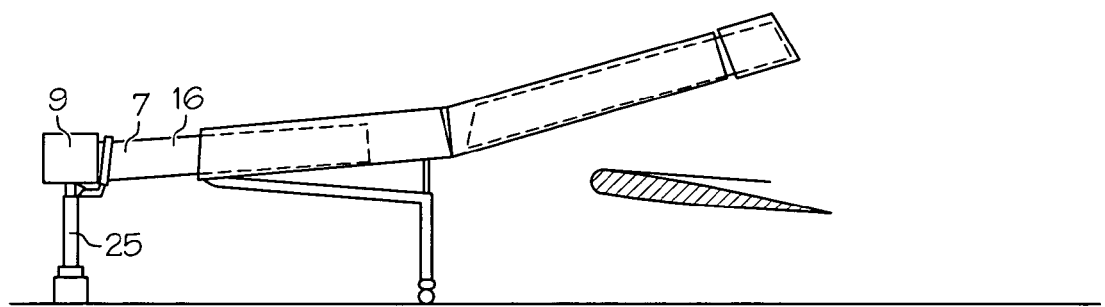
Figure 12:
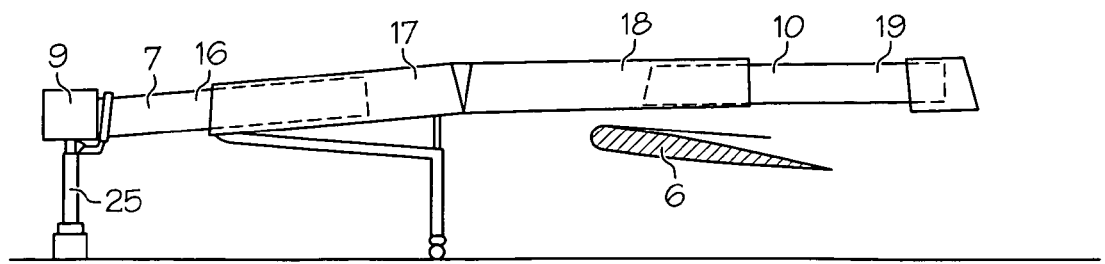

FIGS. 10-12 illustrate a sequence corresponding to that illustrated in FIGS. 4-6, although in this case the passenger bridge 4 is shown docked to a rearwardly located door A8 on the upper deck of the aircraft.

Figure 13:
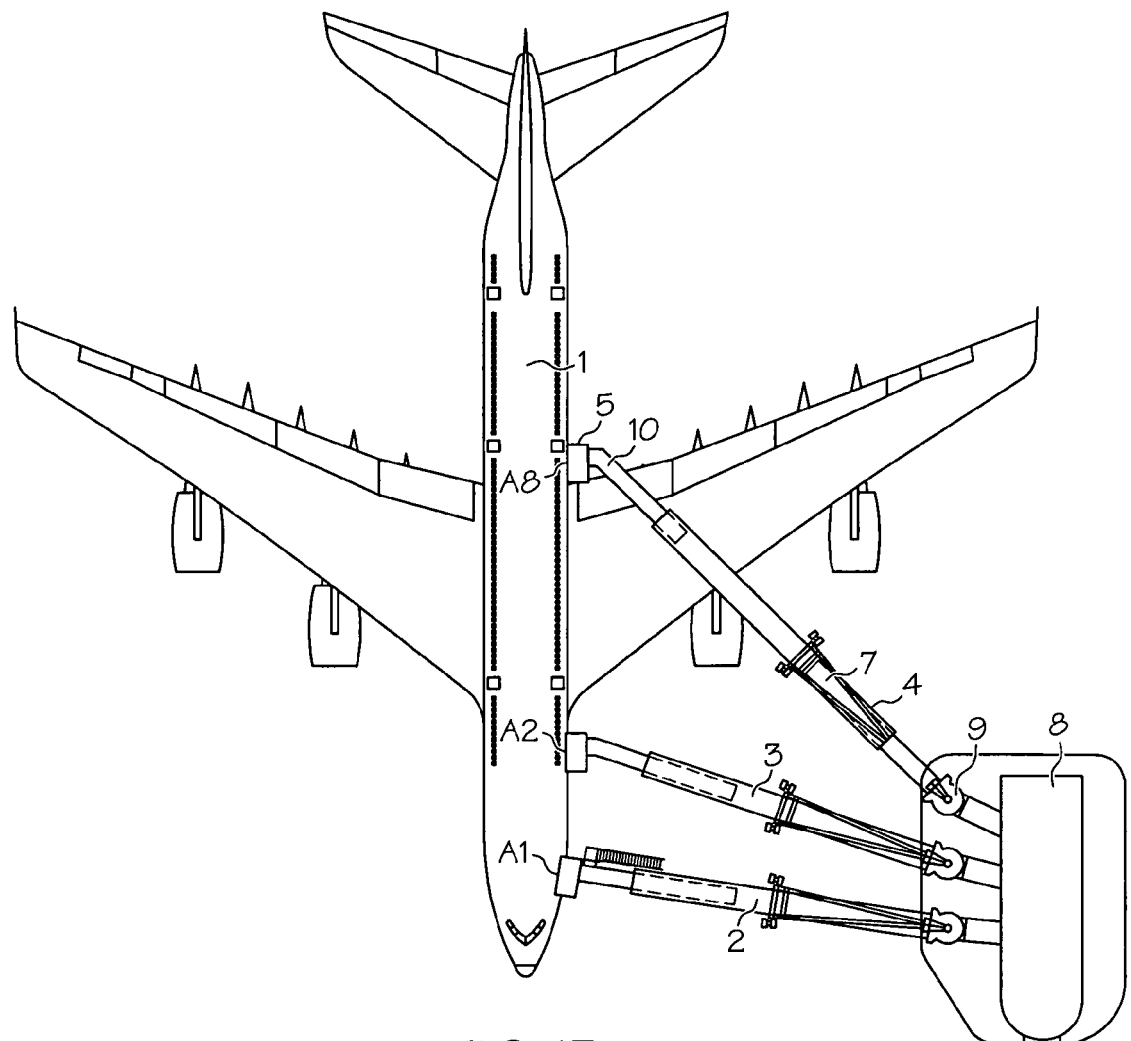
FIG. 13 is a top view showing three passenger bridges connected to a rear door A8 on the upper deck and to two forwardly located doors A1 and A2 on the lower deck, respectively.

FIG. 13 illustrates from above the state in which the bridges shown in the figure have been docked both to forwardly located passenger doors and to a rearwardly located passenger door A8 on the upper deck.

Figure 14:
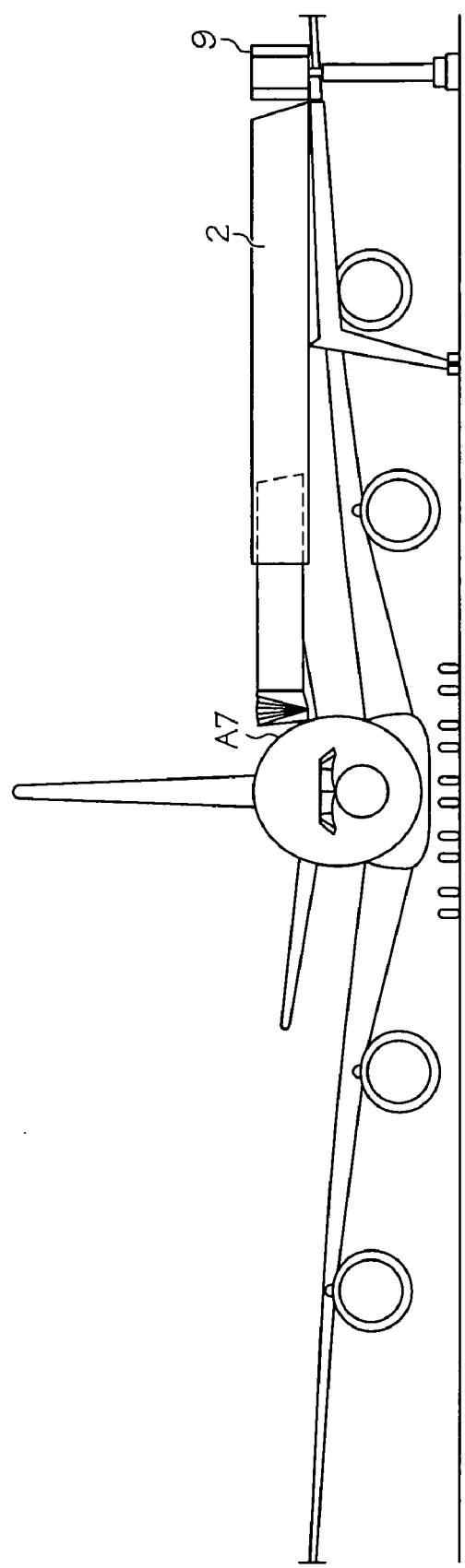
FIG. 14 is a side view of a passenger bridge connected to a forwardly located door on the upper deck.

FIG. 14 is a side view of the forwardly located passenger bridge 2 docked to a forwardly located door A7 on the upper deck.

FIG. 15 is a side view of the forwardly located bridge 2 docked to a forwardly located door A2 on the lower deck.

The passenger bridge 4 can be docked to rearwardly located doors on both the upper and lower deck, by virtue of the fact that the bridge 4 can be raised to an extent such as to allow the drive means 12 to reach the region of the leading edge of the wing of the aircraft, in combination with the ability to swing down the outer part 10 of the bridge 4 relative to the inner part 7 of the bridge. Docking is achieved relatively quickly, since the passenger bridge is moved to a limited extent on the ground, from its starting position to its end position at the leading edge of the wing. In addition, two other passenger bridges are docked to two other forwardly located passenger doors at the same time.

It is obvious that the present invention solves the problems identified in the introduction.

Although the invention has been described with reference to a number of exemplifying embodiments thereof, it will be obvious that those embodiments can be varied. For example, the passenger bridge drive means can include more than one wheel pair and more than one support means. Furthermore, the bridge 4 pivoting means at the junction of the inner and outer parts can have some other design. In addition, the outer part 10 of the passenger bridge can be provided with a downwardly swingable vertical support at its outer end, such as an hydraulically operated support.

The present invention shall not therefore be considered limited to the above-described and illustrated exemplary embodiments thereof, since variations and modifications can be made within the scope of the following claims.

The invention claimed is:

1. Apparatus for connecting an outermost end of a telescopically extendable passenger bridge to a door located on an aircraft body, wherein the door is located on one side of the aircraft and aft of and below the level of an aircraft wing tip, said apparatus comprising:

a passenger bridge including a telescopically extendable inner part and a telescopically extendable outer part, wherein an inner end of the inner part of the passenger bridge is pivotally connected to a rotunda adjacent to a terminal building for pivotal movement in a vertical plane relative to the rotunda, and wherein the outer part of the passenger bridge includes at an outermost end a cabin for placement against an aircraft at an aircraft door;

drive means having wheels and connected to the passenger bridge for moving the bridge, wherein the drive means is positioned at an outer end of the inner part of the passenger bridge for moving the outer end of the inner part of the bridge toward and away from a wing of the aircraft;

a ground-mounted vertical pillar for supporting the rotunda and including lifting means to change the length of the pillar and thereby displace the rotunda and the inner end of the inner part of the bridge in a vertical direction relative to the terminal building;

displacement means carried by the drive means for varying the vertical position relative to the wing of the aircraft of the outer end of the inner part of the passenger bridge and of an inner end of the outer part of the bridge in a vertical direction relative to the inner end of the inner part of said bridge;

whereby subsequent to an aircraft being parked for connection to the passenger bridge, the passenger bridge is movable by the drive means from a parking position to a docking position, wherein the height and the inclination relative to the ground of the inner part of the passenger bridge are adjustable by actuating the lifting means and by actuating the displacement means to achieve a desired height above an upper surface of the aircraft wing and a desired inclination relative to the ground of the inner part of the bridge, and wherein the drive means is movable to telescopically extend the inner part of the bridge and to move the drive means close to a leading edge of the aircraft wing;

pivoting means for pivoting the outer part of the bridge relative to the inner part about a horizontal pivot axis to move the outer part of the bridge between a position at which the outermost end of the outer part of the bridge is above the longitudinal axis of the inner part of the bridge to allow the outer part of the bridge to clear the wing and the wing tip of the aircraft, and a position at which the outermost end of the outer part of the bridge is below the longitudinal axis of the inner part of the bridge to allow the cabin to be positioned at an aircraft door; and means for telescopically extending the outer part so that an outermost end of the outer part of the bridge is at an end position at which the cabin is docked adjacent to a passenger door in the aircraft body.

2. Apparatus according to claim 1, wherein the inner part of the passenger bridge and the outer part of the bridge are each movable vertically, and wherein the outer part of the passenger bridge is vertically movable to a position at which the outer part of the passenger bridge can pass freely over an upper surface of the wing of the aircraft.

3. Apparatus according to claim 2, wherein the vertical position of the outer end of the outer part of the bridge is adjustable by the pivoting means; and wherein the pivoting means extends between and acts upon the outer end of the inner part of the bridge and the inner end of the outer part of the bridge for relative pivotal movement of the inner and outer bridge parts about the pivot axis, so that by actuating the lifting means and the displacement means of the drive means an inclination angle of the inner part relative to the ground is adjustable, and by actuating the pivoting means an inclination angle relative to the ground of the outer part is adjustable for passenger comfort during boarding and disembarking.

* * * * *